2,876,653

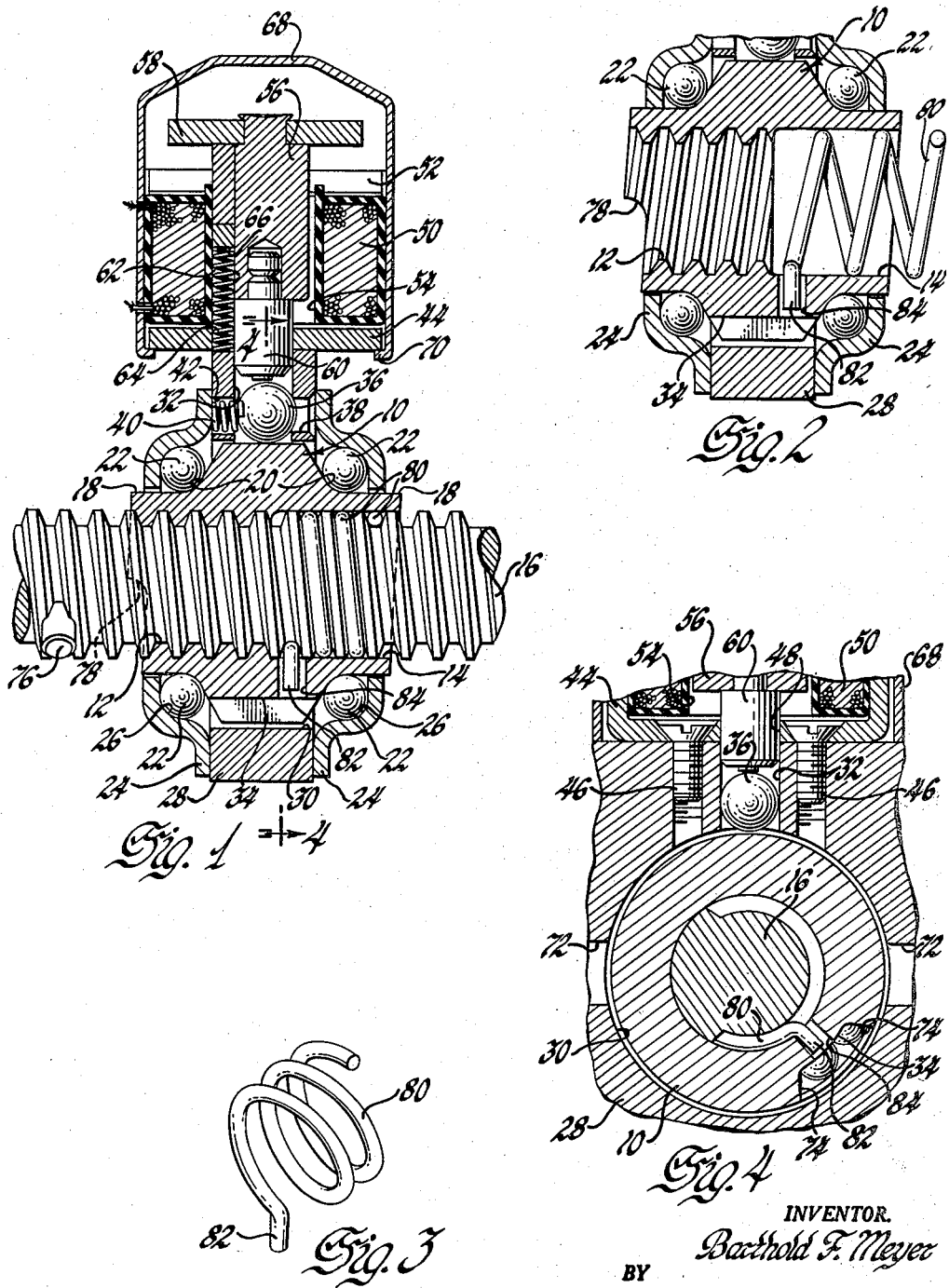

MECHANICAL MOVEMENT DEVICE

Barthold F. Meyer, St. Clair Beach, Ontario, Canada, assignor to General Motors Corporation, Detroit, Mich., a corporation of Delaware Application April 1, 1958, Serial No. 725,685

5 Claims. (Cl. 74—424.8)

This invention relates to mechanical movement devices and more particularly to screw and nut actuators.

The screw and nut actuator of this invention is of the general type including a helically threaded lead screw and a nut threadedly receiving the lead screw and selectively brakeable to a non-rotatable member to prevent the nut from rotating and thereby cause the nut to move axially along the lead screw upon rotational movement thereof. The non-rotatable member may be an operable member so as to be operated upon axial movement of the nut along the lead screw. Actuators of this type have many uses and are often used in power operated vehicle seat adjuster structures.

In many present actuators, the nut includes a threaded bore which threadedly receives the lead screw to thereby frictionally and mechanically interconnect the nut and lead screw for simultaneous rotation when the nut is not selectively braked to the non-rotatable member and the lead screw is rotated. After continued use, the thread of the nut or of the lead screw or both often become worn so that the interconnection between the nut and the lead screw often becomes very loose whereby the nut will either not rotate with the lead screw or will rotate intermittently therewith so that there is axial movement of the nut along the lead screw despite the nut not being braked to the non-rotatable member. In addition, this condition often causes chattering between the nut and the lead screw to produce objectionable noise.

In many seat adjuster structures, a screw and nut actuator is provided on each side of the seat with the nuts of the spaced actuators corresponding to each other to move each side of the seat through an equal distance upon simultaneous rotational movement of the respective lead screws. As pointed out above, undue wear of the thread of the nut or of the lead screw or both often causes the nut to move axially along the lead screw upon rotation thereof despite the nut not being braked to the non-rotatable member. Such a condition often leads to one side of the seat being advanced or retracted relative to the other side of the seat so that the seat becomes cocked transversely of the body. This aggravates the wear of the thread of the nut or of the lead screw and can lead to binding of the seat so that all movement of the seat may be prevented.

The screw and nut actuator of this invention overcomes the problem of undue wear of the thread of the nut or of the lead screw or both and effectively causes the nut to rotate simultaneously with the lead screw whenever the nut is not braked to the non-rotatable member and the lead screw is rotated. Thus, there is no axial movement of the nut along the lead screw at any time unless the nut is braked; and there is also no objectionable noise or chattering. In the preferred embodiment of this invention a portion of the thread in the bore of the nut is removed and a compression spring having a lead greater than the lead of the lead screw is inserted within the bore of the nut and is compressed to the lead of the thread of the lead screw, with one end of this spring being anchored to the nut. Thus, an axial force is imparted between the threads of the lead screw and of the nut to increase the torque required to rotate the nut relative to the lead screw, and this axial force is ample to prevent any axial movement whatsoever of the nut along the lead screw whenever the nut is not braked to the non-rotatable member and the lead screw is rotated. In addition, all wear of the thread of the nut or of the lead screw or both is instantly taken up by the compression spring since the spring has a greater lead than the lead of the lead screw and is compressed to the lead of the lead screw.

The primary object of this invention is to provide an improved screw and nut actuator. Another object of this invention is to provide an improved screw and nut actuator which includes a threaded lead screw and a nut threadedly receiving the lead screw and selectively brakeable to a non-rotatable member in combination with means secured to the nut and engageable with the thread of the lead screw to provide an axial force between the nut and the lead screw.

A further object of this invention is to provide an improved screw and nut actuator of the type including a helically threaded lead screw and a nut threadedly receiving the lead screw and selectively brakeable to a non-rotatable member in combination with compression spring means secured to the nut and having a greater lead than the lead of the lead screw, with the compression spring means being compressed to and following the lead of the lead screw to thereby effectively prevent any relative rotational movement between the nut and the lead screw whenever the lead screw is rotated and nut is not selectively braked to the non-rotatable member.

These and other objects of this invention will be readily apparent from the following specification and drawings, wherein:

Figure 1 is a partial axial sectional view of a screw and nut actuator according to this invention;

Figure 2 is a view of a portion of Figure 1 with parts thereof omitted;

Figure 3 is a perspective view of the compression spring between the nut and lead screw; and Figure 4 is a partial sectional view taken along the plane indicated by line 4—4 of Figure 1.

Referring now particularly to the drawings, a nut 10 includes a helically threaded bore portion 12 and an annular bore portion 14 which are axially aligned with each other and which receive a helically threaded lead screw 16 to mechanically and frictionally interconnect the nut and the lead screw by means of the cooperating threaded bore portion 12 and lead screw. Nut 10 further includes an oppositely extending pair of peripheral flanges 18, each of which defines a continuous arcuate annular shoulder 20 with the nut body to provide the inner race for a plurality of ball bearings 22. The outer race of the ball bearings is provided by a pair of like aperturer closures 24, each of which is provided with a continuous annular arcuate shoulder 26. The closures 24 are suitably secured to opposite flat faces of a generally square shaped housing 28 which is provided with an annular bore 30 receiving then nut 10.

Housing 38 is further provided with a radial bore 32 which opens to bore 30 and the upper surface of the housing and is adapted to be aligned with an axially extending slot 34 of nut 10 during each revolution of the nut relative to the housing. A ball bearing 36 having a diameter substantially equal to that of bore 32 is slidably and rotatably mounted therein and is normally held against the opening of an axial bore 38 in housing 30 by means of a coil compression spring 40 fitting within an axial bore 42 of the housing and seating against one of the closures 24. It can be seen that the compression spring 40 normally holds the ball bearing 36 against the opening of bore 38 unless the ball bearing is moved outwardly of the bore 32 and out of engagement with the spring 40.

A generally U-shaped bracket 44 is bolted at 46 to the upper surface of housing 28 and is provided with a bore 48 which is aligned with the bore 32 of the housing. A solenoid coil 50 is mounted within the bracket 44 and the legs of the bracket are bent laterally at 52 to secure the solenoid coil in place. The solenoid coil is provided with a central, generally square-shaped opening 54 and a generally square-shaped solenoid armature 56 is received within the opening 54. The armature 56 is provided with a flat head 58 which is adapted to engage the laterally bent legs 52 of bracket 44 to limit inward movement of the armature within the opening of the coil. A plunger 60 is secured in a suitable manner to the armature 56 and is slidably received within bores 48 and 32 of bracket 44 and housing 28, respectively. A groove 62 is provided in one side of the armature 56 and a coil spring 64 fits within this groove, with one end thereof engaging an end wall 66 of the groove and the other end thereof engaging the upper surface of housing 28 to normally hold the solenoid armature 56 in its position as shown in Figures 1 and 4 and thereby hold the plunger 60 immediately adjacent but out of engagement with the ball bearing 36. A closure cap 68 is provided for the solenoid coil and armature and the cap is secured in place in engagement with the upper surface of housing 28 by bending one or more tangs 70 of the cap under the bracket 44.

The housing 28 is normally secured to a non-rotatable member which may also be an operable member. As partially shown in Figure 4, opposite sides of the housing may be provided with bores 72 to receive fastening members to secure the housing 28 to the operable member to hold the housing against rational mevement, although axial movement thereof is permitted relative to the axis of rotation of the lead screw 16 and the nut 10.

When the solenoid armature 56 is in its position as shown in Figures 1 and 4, and the lead screw 16 is rotated, the nut 10 will normally rotate with the lead screw whereby the two members rotate in unison and no axial movement of the nut relative to the lead screw takes place. However, should the solenoid coil 50 be energized to move the solenoid armature 56 inwardly of the opening 54 of the coil, the plunger 60 which is fixed to the armature will move ball bearing 36 out of engagement with spring 40 and into engagement with the slot 34 of nut 10 to thereby brake the nut to the housing 28. If the lead screw 16 is now rotated, the nut 10 cannot rotate with the lead screw and the nut and housing 28 will, therefore, move axially along the lead screw in either direction depending on the direction of rotational movement of the lead screw.

When the solenoid coil 50 is deenergized, the spring 64 returns the armature 56 to its position as shown in Figure 1 to move the plunger 60 out of engagement with the ball bearing 36. As shown in Figure 4, opposite axially extending sides 74 of slot 34 are sloped so that the nut 10 will thereupon cam the ball bearing 36 out of engagement with the slot 34 and into engagement with the spring 40 to again seat the ball bearing within the opening of the bore 38 to release the brake between the nut and housing. As shown in Figure 1, a pin 76 may be secured to the lead screw 16 on one or both sides of the nut 10 to cooperate with a shoulder 78 on flange 18 of the nut and thereby limit axial movement of the nut along the lead screw in either one or both directions. Should the nut 10 move along the lead screw so that the shoulder 78 engages the pin 76, the nut 10 must thereupon rotate with the lead screw and the ball bearing 36 will be cammed out of the slot 34 by the sloping sides 74 thereof during each revolution of the nut relative to the housing 28. This will also continually move the solenoid armature 56 between its normal and its operative positions and produce a clicking noise so as to indicate to the operator that the solenoid coil 50 should be deenergized.

Since the only interconnection between the nut 10 and the lead screw is furnished by the threaded bore portion 12 of the nut and the helical thread of the lead screw, any undue wear of either thread will lead to the nut 10 either not rotating or intermittently rotating with the lead screw 16 whenever the solenoid coil 50 deenergized so that the nut 10 is not braked to the housing 28. This condition is objectionable since it will cause the nut 10 and housing 30 to move axially relative to the lead screw and additionally will often cause objectionable noise due to chattering between the nut and the lead screw since the two are not rotating in unison despite the fact that the solenoid coil 50 is deenergized.

In order to solve this problem, this invention provides a helical coil spring 80 which is received within the bore portion 14 of the nut with one end 82 of the spring being anchored within a radial bore 84 of the nut. As can be seen in Figures 2 and 3 of the drawings, the spring in its normal uncompressed condition has a much greater lead than the lead of the lead screw whereby the spring must be compressed when fitted within the helical groove of the lead screw. Since one end of the spring is anchored to the nut, it can be seen that the spring provides an axial force biasing the nut and the lead screw in opposite axial directions with respect to each other. Thus, should any undue wear of the thread of the nut or of the lead screw occur, the compression spring 68 will instantly take up this wear so that the threads of the nut and lead screw will always be held in frictional engagement with each other whereby the nut will rotate with the lead screw whenever the nut is not selectively braked to the housing 28. In addition, no objectionable noise can occur due to chattering or relative movement between the nut and lead screw since such relative movement is prevented.

Thus, this invention provides a new and improved screw and nut actuator which includes a helically threaded lead screw and a nut threadedly receiving the lead screw and selectively brakeable to a non-rotatable member in combination with a coil compression spring anchored to the nut and received with the helical groove of the lead screw, with the spring, in its uncompressed condition, having a greater lead than the lead screw to thereby impart an axial force biasing the nut and lead screw apart relative to each other when anchored to the nut and received within the helical groove of the lead screw.

I claim:

1. A mechanical movement device comprising, first and second rotatable members, means interconnecting said members for axial movement of one member relative to the other member upon relative rotational movement therebetween, a non-rotatable member, means rotatably supporting said one member on said non-rotatable member, selectively operable means on said non-rotatable member for selectively braking said one member to said non-rotatable member for axial movement thereof along said other member upon rotational movement thereof, and means interconnecting said rotatable members and exerting an axial force continually biasing said members apart.

2. A mechanical movement device comprising, a lead screw, a nut threadedly receiving said lead screw for axial movement therealong upon relative rotational movement therebetween, a non-rotatable member, means rotatably supporting said nut on said non-rotatable member, selectively operable means on said non-rotatable member for selectively braking said nut thereto for axial movement of said nut along said lead screw upon rotational movement thereof, and means interconnecting said nut and lead screw and exerting a force continually biasing said nut and lead screw apart in an axial direction to thereby hold the threads of said nut and lead screw in tight frictional engagement.

3. A mechanical movement device comprising, a lead screw, a nut threadedly receiving said lead screw for axial movement therealong upon relative rotational movement therebetween, a non-rotatable member, means rotatably supporting said nut on said non-rotatable member, selectively operable means on said non-rotatable member for selectively braking said nut thereto for axial movement of said nut along said lead screw upon rotational movement thereof, and compression spring means secured to said nut and rotatably secured to said lead screw to exert an axial force continually biasing said nut and lead screw apart in an axial direction.

4. A mechanical movement device comprising, a lead screw, a nut threadedly receiving said lead screw for axial movement therealong upon relative rotational movement therebetween, a non-rotatable member, means rotatably supporting said nut on said non-rotatable member, selectively operable means on said non-rotatable member for selectively braking said nut thereto for axial movement of said nut along said lead screw upon rotational movement thereof, and coil compression spring means secured to said nut and received within the helical groove of said lead screw, said compression spring means having a greater lead in an uncompressed condition than the lead of said lead screw whereby said compression spring means exerts a force biasing said members apart in an axial direction when received within the helical groove of said lead screw.

5. A mechanical movement device comprising, a helical lead screw, a nut having a bore therethrough provided with a threaded portion for threadedly mounting said nut on said lead screw for axial movement therealong upon relative rotational movement therebetween, a non-rotatable housing, means rotatably supporting said nut within said housing, selectively operable means on said housing for selectively braking said nut thereto for axial movement of said nut and housing along said lead screw upon rotational movement thereof, and a coil compression spring secured to said nut and received within the helical groove of said lead screw to exert an axial force continually biasing said nut and lead screw apart in an axial direction, said coil compression spring having a greater lead than said lead screw in an uncompressed condition thereof.

References Cited in the file of this patent
UNITED STATES PATENTS

| | | |
|---|---|---|
| 1,276,811 | Ragan | Aug. 27, 1918 |
| 2,504,018 | Gibson et al. | Apr. 11, 1950 |
| 2,701,478 | Riess | Feb. 8, 1955 |
| 2,716,352 | Wilson | Aug. 30, 1955 |